United States Patent
Sugio

(10) Patent No.: US 10,525,592 B2
(45) Date of Patent: Jan. 7, 2020

(54) ROBOT SYSTEM

(71) Applicant: FANUC CORPORATION, Yamanashi (JP)

(72) Inventor: Kenji Sugio, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 79 days.

(21) Appl. No.: 15/980,303

(22) Filed: May 15, 2018

(65) Prior Publication Data
US 2018/0333849 A1    Nov. 22, 2018

(30) Foreign Application Priority Data

Jun. 18, 2017 (JP) ................................ 2017-099231

(51) Int. Cl.
*B25J 9/16*    (2006.01)
*B25J 9/00*    (2006.01)

(52) U.S. Cl.
CPC ........... *B25J 9/1664* (2013.01); *B25J 9/0093* (2013.01); *B25J 9/1694* (2013.01); *Y10S 901/09* (2013.01)

(58) Field of Classification Search
CPC ....... B25J 9/1664; B25J 9/1694; B25J 9/0093
See application file for complete search history.

(56) References Cited

U.S. PATENT DOCUMENTS

| | | |
|---|---|---|
| 5,711,697 A | 1/1998 | Taninaga et al. |
| 6,021,361 A | 2/2000 | Taninaga et al. |
| 2011/0010012 A1* | 1/2011 | Murayama ............... B25J 19/06 700/260 |
| 2014/0156068 A1* | 6/2014 | Graca ................... B25J 9/1666 700/248 |
| 2015/0005940 A1* | 1/2015 | Ichibangase ............. B25J 9/102 700/258 |
| 2016/0100898 A1 | 4/2016 | Jinno et al. |
| 2017/0290345 A1* | 10/2017 | Garden .................... A21B 7/00 |

(Continued)

FOREIGN PATENT DOCUMENTS

| | | |
|---|---|---|
| CN | 1150401 A | 5/1997 |
| CN | 104203505 A | 12/2014 |

(Continued)

OTHER PUBLICATIONS

Chinese Office Action dated Jun. 5, 2019, for Chinese Patent Application No. 201810462651.0.

(Continued)

*Primary Examiner* — Kira Nguyen
(74) *Attorney, Agent, or Firm* — Karceski IP Law, PLLC

(57) ABSTRACT

Provided is a robot system includes a conveyor; a conveyor speed detection unit for detecting a movement speed of the conveyor; a robot for performing a task on the workpiece; a worker state input unit for inputting a collaboration state of a worker; and a control unit for controlling the robot based on the movement speed and the collaboration state of the worker. The control unit calculates a first speed based on the movement speed of the conveyor, calculates a second speed of a distal end of an arm of the robot, in a direction intersecting a direction of the first speed, causes the distal end of the arm to move at a speed combining the first speed and the second speed, and limits the second speed, when the collaboration state of the worker is input.

5 Claims, 6 Drawing Sheets

(56) References Cited

U.S. PATENT DOCUMENTS

2018/0111765 A1\* 4/2018 Wicks .................. B65G 37/00
2019/0021753 A1    1/2019 Jinno et al.

FOREIGN PATENT DOCUMENTS

| | | |
|---|---|---|
| EP | 2829371 A1 | 1/2015 |
| GB | 2319097 A | 5/1998 |
| JP | 2000-095324 | 4/2000 |
| JP | 2002192487 A | 7/2002 |
| JP | 2010076903 A | 4/2010 |
| JP | 2012171067 A | 9/2012 |
| JP | 2014014901 A | 1/2014 |
| JP | 2014172159 A | 9/2014 |
| JP | 2015175010 A | 10/2015 |
| JP | 2016193473 A | 11/2016 |
| WO | 2014199413 A1 | 12/2014 |

OTHER PUBLICATIONS

Japanese Decision to Grant a Patent dated Feb. 12, 2019, for Japanese Patent Application No. 2017-099231.

\* cited by examiner

ROBOT SYSTEM

CROSS-REFERENCE TO RELATED APPLICATIONS

This application is based on and claims priority to Japanese Patent Application No. 2017-099231, filed on May 18, 2017, the entire content of which is incorporated herein by reference.

FIELD OF THE INVENTION

The present invention relates to a robot system.

BACKGROUND OF THE INVENTION

Conventionally, there is known a robot system according to which a robot disposed outside a conveyor performs a task on a workpiece conveyed by the conveyor while following the conveyor (for example, see Japanese Unexamined Patent Application, Publication No. 2000-95324).

In this robot system, a swivel operation of an arm of a robot and a travelling operation of a drive unit are restricted at a time when swiveling of the arm and travelling of a travelling unit are performed in a coordinated manner, so that a distal end of the arm moves at a maximum speed.

SUMMARY OF THE INVENTION

The present invention provides the following solutions.

An aspect of the present invention provides a robot system including a conveyor for conveying a workpiece, a conveyor speed detection unit for detecting a movement speed of the conveyor, a robot, disposed near the conveyor, for performing a task on the workpiece being conveyed by the conveyor, a worker state input unit for inputting a collaboration state of a worker, and a control unit for controlling the robot based on the movement speed of the conveyor detected by the conveyor speed detection unit and the collaboration state of the worker input by the worker state input unit, where the control unit includes a tracking speed calculation unit for calculating a first speed, in a conveying direction, at which the robot is caused to follow the conveyor, based on the movement speed of the conveyor detected by the conveyor speed detection unit, a relative movement speed calculation unit for calculating a second speed, of a distal end of an arm of the robot, in a direction intersecting a direction of the first speed, a movement command generation unit for commanding the robot to move the distal end of the arm at a speed combining the first speed and the second speed, and a speed limit switching unit for limiting the second speed calculated by the relative movement speed calculation unit, when an input is performed by the worker state input unit to an effect that the worker is in the collaboration state.

DESCRIPTION OF EMBODIMENT(S) OF THE INVENTION

Hereinafter, a robot system 1 according to an embodiment of the present invention will be described with reference to the drawings.

Figure 1:
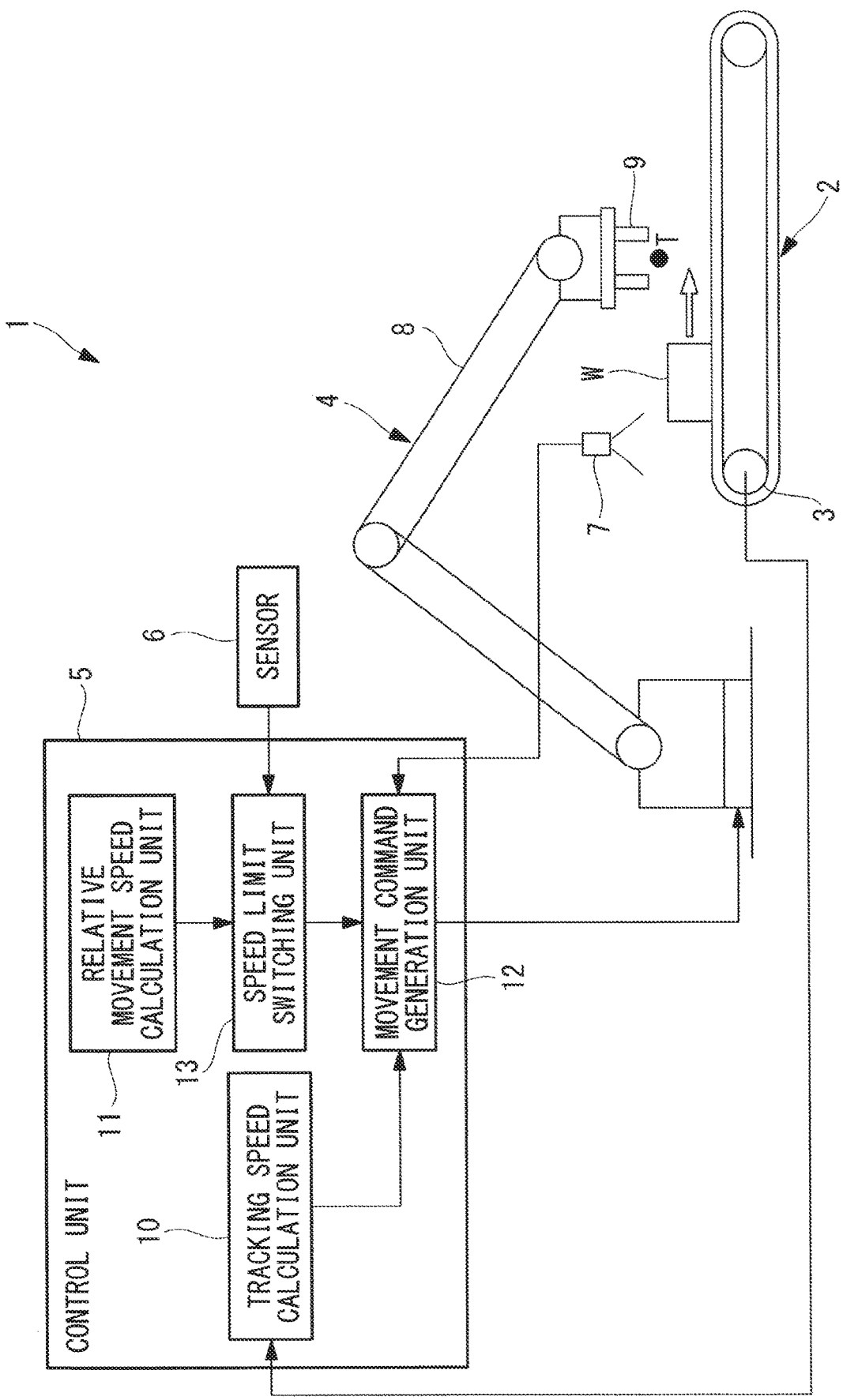
FIG. 1 is an overall configuration diagram showing a robot system according to an embodiment of the present invention.

As shown in FIG. 1, the robot system 1 according to the present embodiment includes a conveyor 2 for conveying a workpiece W, an encoder (conveyor speed detection unit) 3 for detecting a speed of the conveyor 2, a robot 4, installed near the conveyor 2, for performing a task on the workpiece W being conveyed by the conveyor 2, a control unit 5 for controlling the robot 4, and a sensor (worker state input unit) 6 for detecting entrance of a worker or the like into an area near a movement range of the robot 4. Furthermore, in the drawing, a reference sign 7 is a workpiece sensor, disposed on an upstream side of the conveyor 2, for detecting presence/absence and a posture of a workpiece W conveyed by the conveyor 2.

In the example shown in FIG. 1, the robot 4 is a 6-axis articulated robot, but this is not restrictive. Moreover, a hand 9 for handling a workpiece W is mounted on a wrist at a distal end of an arm 8 of the robot 4. Any other tool may be mounted instead of the hand 9 to perform a task other than handling.

The control unit 5 includes a memory (not shown) storing a program and the like which are taught in advance, and a processor (not shown) for controlling the robot 4 according to the program.

When a workpiece W is detected by the workpiece sensor 7, the program calculates an offset between a standby position of the robot 4 and a target position where the workpiece W is to be grasped by the hand 9, and plans a movement command for each axis of the robot 4 for covering the calculated offset by a shortest distance, for example. Specifically, a tool center point (TCP) set at a grasping position (a center position between claws of a chuck) of the workpiece W by the hand 9 mounted on the wrist of the robot 4 is given as a control point T, and a movement command for moving the control point T to the target position is calculated.

The program is taught to then, according to the planned movement command, cause the robot 4 to start moving, cause the control point T to reach a position which is vertically above the workpiece W and which is calculated based on a conveying speed of the conveyor 2 detected by the encoder 3, cause the robot 4 to move so as to move the hand 9 side by side with the workpiece W, and lower the hand 9 while rotating the hand 9 according to the posture of the workpiece W, lift up the workpiece W grasped by operation of the hand 9 from the conveyor 2 and convey the workpiece W to a predetermined conveyance destination, and end the task.

Figure 2:
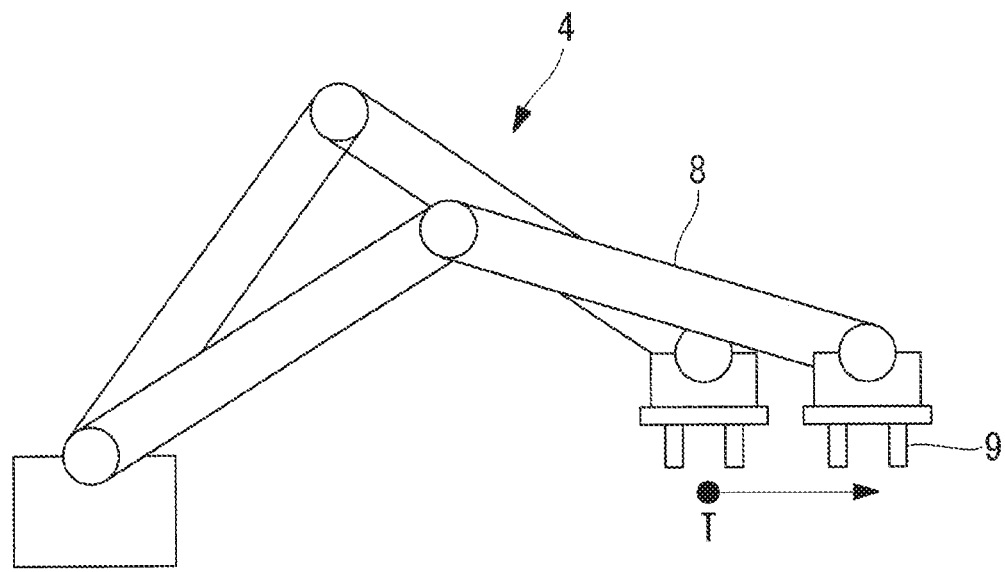
FIG. 2 is a schematic diagram describing a first speed of a robot of the robot system in FIG. 1.
Figure 3:
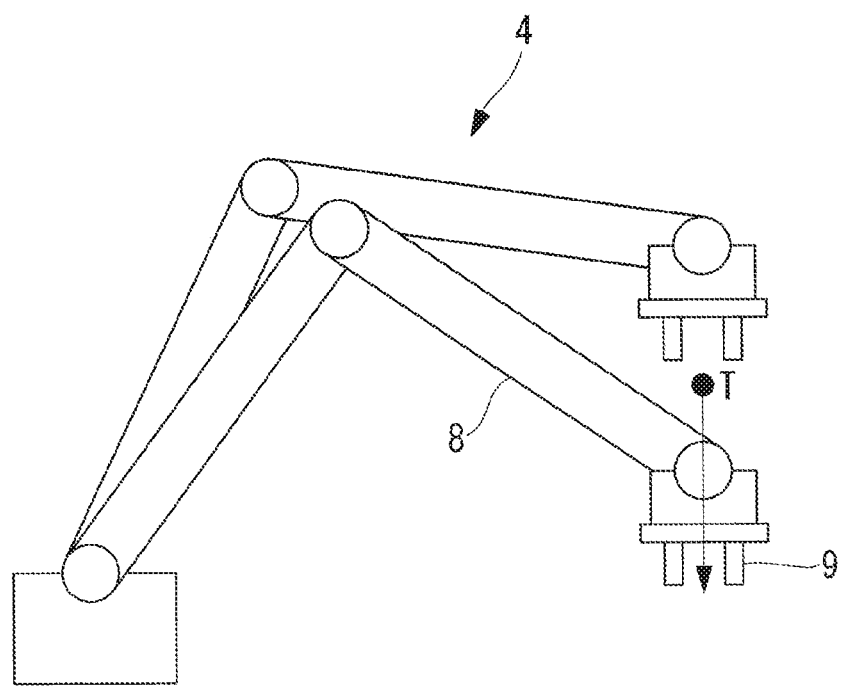
FIG. 3 is a schematic diagram describing a second speed of the robot of the robot system in FIG. 1.
Figure 4:
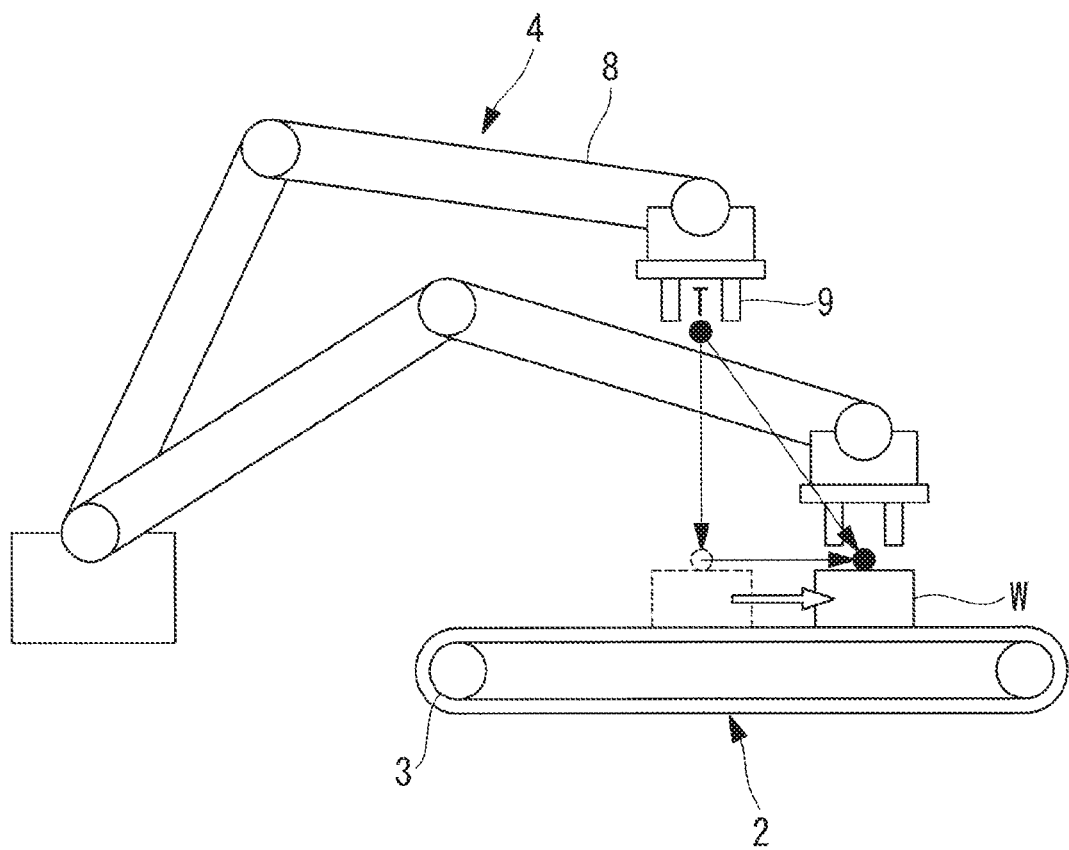
FIG. 4 is a schematic diagram describing a speed combining the first speed in FIG. 2 and the second speed in FIG. 3.

More specifically, the control unit 5 includes a tracking speed calculation unit 10 for calculating a first speed, along a conveying direction of the conveyor 2, of the robot 4 from the standby position to the target position based on the conveying speed of the conveyor 2 detected by the encoder 3, as shown in FIG. 2, a relative movement speed calculation unit 11 for calculating a second speed in a direction orthogonal to that of the first speed, as shown in FIG. 3, and a movement command generation unit 12 for planning a target position when the control point T is moved at a speed combining the first speed calculated by the tracking speed calculation unit 10 and the second speed calculated by the relative movement speed calculation unit 11, and commanding the robot 4 to move to the target position, as shown in FIG. 4. The control unit 5 further includes a speed limit switching unit 13 for reducing the second speed calculated by the relative movement speed calculation unit 11, in a case where entrance of a worker or the like into an area near a movement range of the robot 4 is detected by the sensor 6.

In a normal state where entrance of a worker or the like is not detected by the sensor 6, the robot 4 is set to handle a workpiece W with the second speed set at a maximum speed. On the other hand, in the case where entrance of a worker or the like is detected by the sensor 6, the speed limit switching unit 13 reduces the second speed to a predetermined proportion, such as 50%.

An effect of the robot system 1 according to the present embodiment configured in the above manner will be described below.

Figure 5:
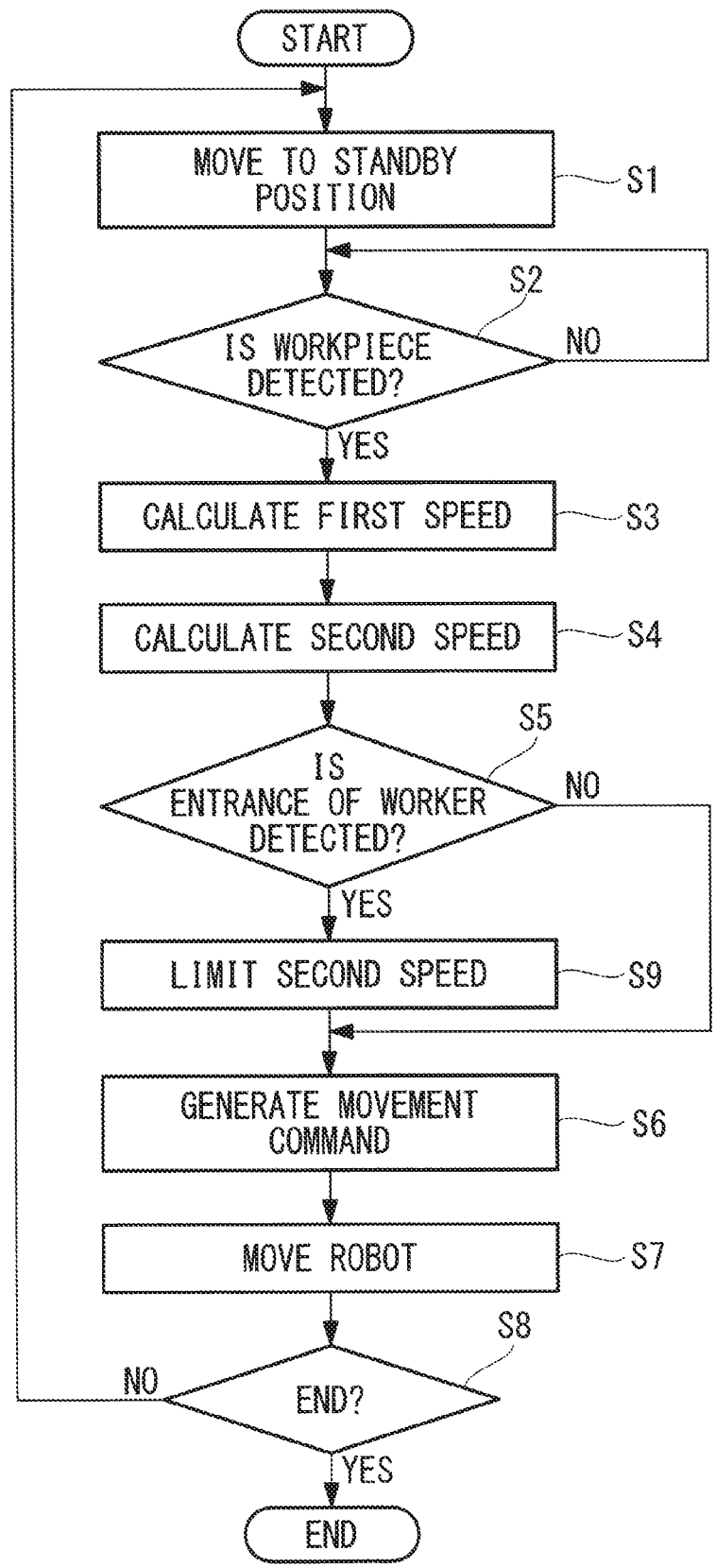
FIG. 5 is a flowchart describing an operation of the robot system in FIG. 1.

As shown in FIG. 5, with the robot system 1 according to the present embodiment, when the program is executed, the robot 4 is moved to the standby position (step S1), and whether a workpiece W conveyed by the conveyor 2 is detected by the workpiece sensor 7 or not is determined (step S2).

Standby is performed at the standby position until a workpiece W is detected, and when a workpiece W is detected, the first speed along the conveying direction of the conveyor 2 is calculated by the tracking speed calculation unit 10 in such a way that the first speed coincides with the conveying speed of the conveyor 2 detected by the encoder 3 (step S3). Furthermore, the second speed in a direction orthogonal to that of the first speed is calculated by the relative movement speed calculation unit 11 (step S4).

Then, whether entrance of a worker or the like into an area near the movement range of the robot 4 is detected by the sensor 6 or not is determined (step S5), and in the case where entrance is not detected, the target position is planned by the movement command generation unit 12 based on the first speed, the second speed, and the posture of the workpiece W detected by the sensor 6, and a movement command for movement from the standby position to the target position is generated (step S6), and the robot 4 is moved according to the movement command (step S7).

At this time, the robot 4 is moved at a combined speed of the first speed and the second speed set at maximum speeds, and reaches the target position where the workpiece W is to be grasped by the hand 9 by a shortest distance, as shown in FIG. 4. Then, the hand 9 is moved closer to the workpiece W while being moved side by side with the workpiece W being conveyed by the conveyor 2, and the hand 9 grasps, lifts up and conveys the workpiece W to the conveyance destination, and then, steps are repeated from step S1 until an end command is input (step S8).

On the other hand, in the case where entrance of a worker or the like into an area near the movement range of the robot 4 is detected in step S5, the speed limit switching unit 13 switches the second speed to a low speed (step S9). The combined speed of the first speed and the second speed generated by the movement command generation unit 12 is thereby sufficiently reduced, compared to a case where entrance of a worker or the like is not detected. Accordingly, there is an advantage that the worker who came close to the movement range of the robot 4 can comfortably perform a task without being afraid of the robot 4 moving at a high speed.

Figure 6:
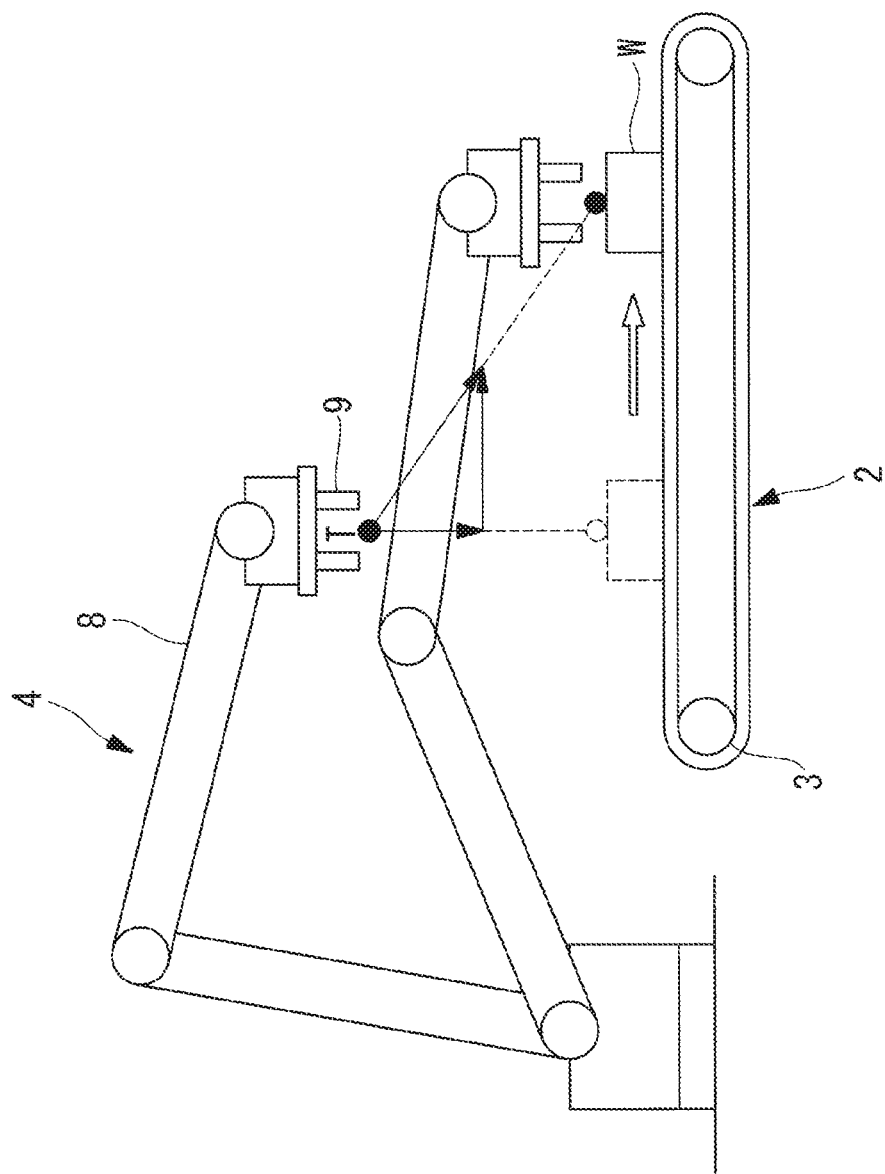
FIG. 6 is a schematic diagram describing movement of the robot where entrance of a worker is detected by a sensor of the robot system in FIG. 1 and the second speed is reduced.

Moreover, in this case, the speed limit switching unit 13 switches only the second speed to a low speed, and the first speed is maintained equal to the conveying speed of the conveyor 2, and thus, although the robot 4 is caused to move the arm 8 over a long distance, as shown in FIG. 6, due to a distance to the target position being increased that in FIG. 4, the workpiece W being conveyed by the conveyor 2 may be grasped and removed without reducing the speed of the conveyor 2.

That is, the robot system 1 according to the present embodiment has an advantage that, even when a worker enters a space near the movement range of the robot 4, the movement speed of the robot 4 may be reduced to allow the worker to comfortably perform a task, and also, because the conveying speed of the conveyor 2 is not reduced, work efficiency may be maintained. Particularly, in a case where another worker or another robot is performing a task on a workpiece W being conveyed by the same conveyor 2, work efficiency of the other worker or the other robot is not advantageously negatively affected, because the conveying speed of the conveyor 2 is not reduced.

Additionally, in the present embodiment, the second speed is reduced when entrance of a worker into a space near the movement range of the robot 4 is detected by the sensor 6, but instead, the second speed may be reduced when information indicating entrance of another object or grasping of a teach pendant of the robot 4 by a worker is detected by the sensor 6 or is input by a worker, for example, by assuming that a collaboration state between a worker and the robot 4 is input.

Furthermore, in the present embodiment, in a case where a worker is in a collaboration state, the second speed of the control point T is limited to 50%, but the second speed may be limited to any other proportion. Moreover, even if the second speed of the control point T is limited to 50%, the speed of another part, such as each joint position, is possibly greater than that of the control point T. Accordingly, an arbitrary focused-on position may be set on the arm 8 of the robot 4, and a limit value (threshold) for the speed may be set for each focused-on position, and the second speed of the control point T may be limited to a proportion at which the speed at every focused-on position is reduced to the limit value or below.

Figure 7:
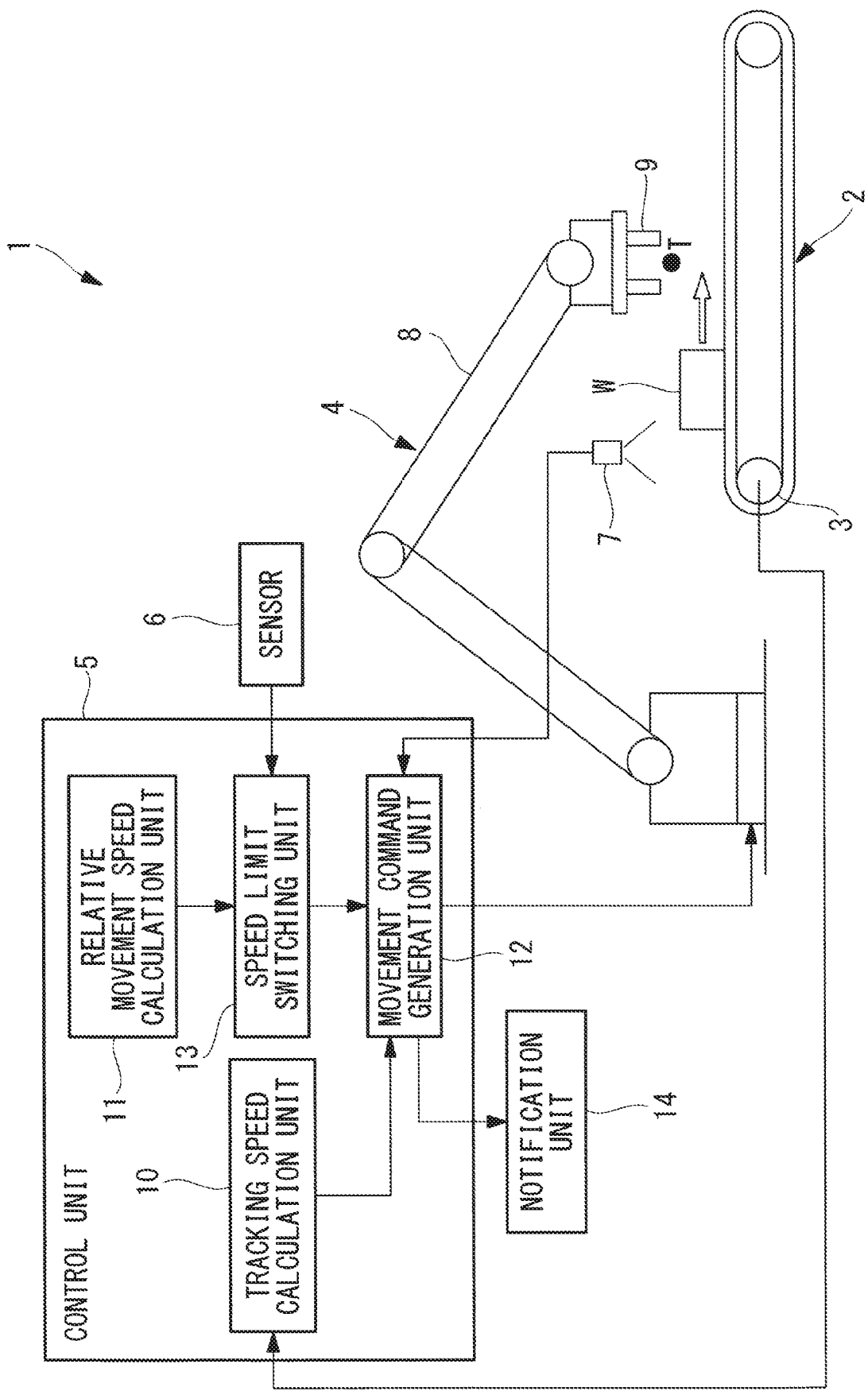
FIG. 7 is an overall configuration diagram showing a modification of the robot system in FIG. 1.

Furthermore, as shown in FIG. 7, there may be provided a notification unit 14 for issuing, in a case where the conveying speed of the conveyor 2 is greater than the maximum speed of the robot 4, or in a case where the target position is placed outside the movement range of the robot 4 due to the speed being limited, a notification to that effect.

Moreover, in the case where the speed of the control point T or any of the focused-on positions is at or above a predetermined threshold after the speed is limited in such a way that the target position falls within the movement range of the robot 4, the notification unit 14 may issue a notification to that effect.

From the above-described embodiments and modifications thereof, the following aspects of the invention are derived.

An aspect of the present invention provides a robot system including a conveyor for conveying a workpiece, a conveyor speed detection unit for detecting a movement speed of the conveyor, a robot, disposed near the conveyor, for performing a task on the workpiece being conveyed by the conveyor, a worker state input unit for inputting a collaboration state of a worker, and a control unit for controlling the robot based on the movement speed of the conveyor detected by the conveyor speed detection unit and the collaboration state of the worker input by the worker state input unit, where the control unit includes a tracking speed calculation unit for calculating a first speed, in a conveying direction, at which the robot is caused to follow the conveyor, based on the movement speed of the conveyor detected by the conveyor speed detection unit, a relative movement speed calculation unit for calculating a second speed, of a distal end of an arm of the robot, in a direction intersecting a direction of the first speed, a movement command generation unit for commanding the robot to move the distal end of the arm at a speed combining the first speed and the second speed, and a speed limit switching unit for limiting the second speed calculated by the relative movement speed calculation unit, when an input is performed by the worker state input unit to an effect that the worker is in the collaboration state.

According to the present aspect, when a workpiece is conveyed by the conveyor, the first speed in a conveying direction, at which the robot is caused to follow the conveyor, is calculated by the tracking speed calculation unit, based on a speed of the conveyor detected by the conveyor speed detection unit, and the second speed in a direction intersecting a direction of the first speed is calculated by the relative movement speed calculation unit. Then, operation is performed such that the arm distal end is moved at a speed combining the calculated first speed and second speed, and a command is issued by the movement command generation unit to the robot. The control unit may thus control the robot, and the distal end of the arm may be brought close to the workpiece conveyed by the conveyor to perform a task.

In this case, the speed limit switching unit performs switching to limit the second speed, in a case where there is an input, to the worker state input unit, of information indicating entrance of a worker into an area near the movement region of the robot or grasping of a teach pendant of the robot by a worker to perform a collaborative task with the robot. As a result, the speed of the robot combining the first speed and the second speed is reduced, and a worker may comfortably perform a task, and also, because the first speed at which the robot is caused to follow the conveyor is not reduced, a task on a workpiece on the conveyor may be performed without hindrance. That is, a worker collaborating with the robot may comfortably perform a task, without reducing work efficiency.

In the aspect described above, the movement command generation unit may command the robot to move a control point set at the distal end of the arm of the robot.

By doing so, the robot may be commanded to cause the control point, as a reference for movement of the robot with respect to the workpiece, to follow the workpiece.

In the aspect described above, the speed limit switching unit may limit the second speed in such a way that a speed of a focused-on portion, of the robot, set in advance falls to a predetermined threshold or below.

In the case where the distal end of the arm is caused to follow the workpiece, the speed of another part of the robot is then possibly excessively increased. In such a case, by limiting the second speed such that the speed of the focused-on portion set in advance falls to a predetermined threshold or below, the second speed of the distal end of the arm may be further reduced to prevent the speed of another part from being excessively increased.

In the aspect described above, there may be provided a notification unit for issuing, in a case where the distal end of the arm, for which a command was issued by the movement command generation unit based on the second speed limited by the speed limit switching unit, is determined to move out of a movement range of the robot during the task, a notification to an effect.

By limiting the second speed, a region in which the robot performs a task on the workpiece is increased in the conveying direction of the conveyor, but in the case where the task will not be completed within the movement range of the robot, the notification unit may issue a notification to that effect such that a measure may be taken.

In the aspect described above, there may be provided a notification unit for issuing, in a case where a speed of the conveyor detected by the conveyor speed detection unit is at or above a threshold, a notification to an effect.

By doing so, in the case where the conveyor moves at a speed at or above a predetermined threshold, the robot may not be able to follow the conveyor, and thus, the notification unit may issue a notification to that effect such that a measure may be taken.

The present invention achieves an effect that a worker collaborating with a robot is enabled to comfortably perform a task, without reducing work efficiency.

The invention claimed is:
1. A robot system comprising:
a conveyor for conveying a workpiece;
a conveyor speed detection unit for detecting a movement speed of the conveyor;
a robot, disposed near the conveyor, for performing a task on the workpiece being conveyed by the conveyor;
a worker state input unit for inputting a collaboration state of a worker; and
a control unit for controlling the robot based on the movement speed of the conveyor detected by the conveyor speed detection unit and the collaboration state of the worker input by the worker state input unit, wherein
the control unit includes
a tracking speed calculation unit for calculating a first speed in a conveying direction, at which the robot is caused to follow the conveyor, based on the movement speed of the conveyor detected by the conveyor speed detection unit,
a relative movement speed calculation unit for calculating a second speed, of a distal end of an arm of the robot, in a direction intersecting a direction of the first speed,
a movement command generation unit for commanding the robot to move the distal end of the arm at a speed combining the first speed and the second speed, and
a speed limit switching unit for limiting the second speed calculated by the relative movement speed calculation unit, when an input is performed by the worker state input unit to an effect that the worker is in the collaboration state.
2. The robot system according to claim 1, wherein the movement command generation unit commands the robot to move a control point set at the distal end of the arm of the robot.
3. The robot system according to claim 1, wherein the speed limit switching unit limits the second speed in such a way that a speed of a focused-on portion, of the robot, set in advance falls to a predetermined threshold or below.

4. The robot system according to claim 1, further comprising a notification unit for issuing, in a case where the distal end of the arm, for which a command was issued by the movement command generation unit based on the second speed limited by the speed limit switching unit, is determined to move out of a movement range of the robot during the task, a notification to an effect.

5. The robot system according to claim 1, further comprising a notification unit for issuing, in a case where a speed of the conveyor detected by the conveyor speed detection unit is at or above a threshold, a notification to an effect.

* * * * *

UNITED STATES PATENT AND TRADEMARK OFFICE
CERTIFICATE OF CORRECTION

| | | |
|---|---|---|
| PATENT NO. | : 10,525,592 B2 | Page 1 of 1 |
| APPLICATION NO. | : 15/980303 | |
| DATED | : January 7, 2020 | |
| INVENTOR(S) | : Kenji Sugio | |

It is certified that error appears in the above-identified patent and that said Letters Patent is hereby corrected as shown below:

On the Title Page

The foreign application priority data is corrected as follows:
(30) Foreign Application Priority Data
May 18, 2017 (JP)............................ 2017-099231

Signed and Sealed this
Tenth Day of March, 2020

Andrei Iancu
*Director of the United States Patent and Trademark Office*